US010219010B2

United States Patent
Cheung et al.

(10) Patent No.: US 10,219,010 B2
(45) Date of Patent: Feb. 26, 2019

(54) SELECTIVE MEDIA PLAYING METHOD AND APPARATUS ACCORDING TO LIVE STREAMING AND RECORDED STREAMING

(71) Applicant: Hanwha Techwin Co., Ltd., Changwon-si (KR)

(72) Inventors: Sweung Won Cheung, Changwon-si (KR); Do Hyun Kim, Changwon-si (KR); Jong Chan Park, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 0 days.

(21) Appl. No.: 15/647,671

(22) Filed: Jul. 12, 2017

(65) Prior Publication Data

US 2018/0027264 A1    Jan. 25, 2018

(30) Foreign Application Priority Data

Jul. 21, 2016 (KR) .................. 10-2016-0092373

(51) Int. Cl.
*H04N 7/173* (2011.01)
*H04N 21/2187* (2011.01)
(Continued)

(52) U.S. Cl.
CPC ..... *H04N 21/2187* (2013.01); *G06F 9/44526* (2013.01); *G06F 9/45529* (2013.01);
(Continued)

(58) Field of Classification Search
CPC ............. H04N 21/2187; H04N 21/236; H04N 21/6437; H04N 21/8173; H04N 21/8456;
(Continued)

(56) References Cited

U.S. PATENT DOCUMENTS 7,447,791 B2    11/2008 Leaning et al.
2012/0317473 A1    12/2012 Pullen et al.
(Continued)

FOREIGN PATENT DOCUMENTS

| EP | 2 835 982 A1 | 2/2015 |
| KR | 10-0967337 B1 | 7/2010 |
| KR | 10-2016-0048430 A | 5/2016 |

OTHER PUBLICATIONS

Anonymous, "HTML5 RTSP PLayer Streamedian/html5_rtsp_player Wiki GitHub," May 23, 2016, XP05539639, 4 pages total.
(Continued)

*Primary Examiner* — John R Schnurr
(74) *Attorney, Agent, or Firm* — Ladas & Parry LLP

(57) ABSTRACT

An apparatus and a method for transmitting media data through live streaming or recorded streaming are provided. Live streaming refers to a case where media being captured in real time by a media service apparatus is played in a user's web browser, and recorded streaming refers to a case where media pre-recorded and stored in a server is played in a user's web browser. In the case of live streaming, since real-time is an important factor, there is provided a media playing method with no initial delay by using a decoder written in a script that can be parsed by a web browser. In the case of recorded streaming, there is provided a media playing method capable of using a decoder embedded in a web browser with no compatibility issue related to a container even when the media service apparatus has no container creation functionality.

15 Claims, 12 Drawing Sheets

(51) Int. Cl.
*H04L 29/06* (2006.01)
*H04L 29/08* (2006.01)
*H04N 21/231* (2011.01)
*H04N 21/2312* (2011.01)
*H04N 21/239* (2011.01)
*G06F 9/455* (2018.01)
*G06F 9/445* (2018.01)
*G06F 9/54* (2006.01)
*H04N 21/6437* (2011.01)
*H04N 21/81* (2011.01)
*H04N 21/236* (2011.01)
*H04N 21/845* (2011.01)
*H04N 21/854* (2011.01)

(52) U.S. Cl.
CPC .......... *G06F 9/541* (2013.01); *H04L 65/4076* (2013.01); *H04L 67/2842* (2013.01); *H04N 21/2312* (2013.01); *H04N 21/2396* (2013.01); *H04N 21/23103* (2013.01); *H04N 21/23116* (2013.01); *H04N 21/6437* (2013.01); *H04N 21/8173* (2013.01); *H04N 21/236* (2013.01); *H04N 21/8456* (2013.01); *H04N 21/85406* (2013.01)

(58) Field of Classification Search
CPC ....... H04N 21/85406; H04N 21/23103; H04N 21/23116; H04N 21/2312; H04N 21/2396; G06F 9/45529; G06F 9/541; H04L 65/4076; H04L 67/2842
See application file for complete search history.

(56) References Cited

U.S. PATENT DOCUMENTS

| | | | |
|---|---|---|---|
| 2014/0181635 A1* | 6/2014 | Clark | G06F 17/2247 715/234 |
| 2014/0282784 A1* | 9/2014 | Pfeffer | H04N 21/64322 725/112 |
| 2015/0052219 A1 | 2/2015 | Staudinger et al. | |
| 2015/0227294 A1* | 8/2015 | Talvensaari | H04L 65/4084 715/717 |
| 2016/0029002 A1* | 1/2016 | Balko | H04N 9/7921 386/230 |
| 2016/0119399 A1 | 4/2016 | Glass | |
| 2016/0173954 A1 | 6/2016 | Speelmans et al. | |

OTHER PUBLICATIONS

Szablewski, Dominic, "HTML5 Live Video Streaming via Websockets—PhobosLab," Sep. 11, 2013, XP055393290, 33 pages total.
Zhu, Guolci, et. al., "HTML5 Based Media Player for Real-Time Video Surveillance," Oct. 16, 2012, 2012 5th International Congress on Image and Signal Processing (CISP 2012), pp. 245-248.
Communication dated Oct. 20, 2017, issued by the European Patent Office in counterpart European application No. 17180909.8.
Communication from the EPO dated Aug. 10, 2018; Appln. No. 17 180 909.8.

* cited by examiner

□ video sent by server  ▽ video in buffer  ○ currently playing  Adaptive HTTP Streaming

SELECTIVE MEDIA PLAYING METHOD AND APPARATUS ACCORDING TO LIVE STREAMING AND RECORDED STREAMING

CROSS-REFERENCE TO THE RELATED APPLICATION

This application claims priority from Korean Patent Application No. 10-2016-0092373, filed on Jul. 21, 2016 in the Korean Intellectual Property Office, the disclosures of which are incorporated herein in their entireties by reference.

BACKGROUND

1. Technical Field

The present disclosure relates to a method and apparatus for playing media in a web browser, and more particularly to a method for playing media in a web browser by selectively using logic for live streaming of media captured in real time and playback of media stored in a server, and an apparatus for performing the method.

2. Description of the Related Art

In order for a user to play media data on a web browser through the Internet, there is a method of using a plug-in in which a decoder, a renderer and the like are written in native code. Representative examples of plug-ins are ActiveX and Netscape Plugin Application Programming Interface (NPAPI), each of which is described below.

ActiveX was developed by Microsoft using a combination of two technologies: Component Object Model (COM) and Object Linking and Embedding (OLE). However, in a narrow sense, it refers to an ActiveX control used in the form of an add-on in Internet Explorer which is a web browser. ActiveX is used to play media in the Internet Explorer web browser.

NPAPI is an application programming interface (API) developed for Netscape browsers, and is similar in functionality to ActiveX of Internet Explorer. NPAPI is an API provided for using an external application program in a plug-in format in order to enhance the function of a web browser, and was used primarily for the web environment in its embryonic stage. In other words, it was developed to play music and videos on early web pages. For example, there are Java Applet, Adobe Flash, Real Player and the like.

However, since a plug-in is sometimes abused by hackers to distribute malicious code, many mainstream web browsers no longer support plug-ins. In the case of NPAPI, Google, which produces and distributes Chrome, no longer supports NPAPI after the release of Chrome version 45. In addition, ActiveX is no longer supported by Microsoft Edge browser, which is the default browser for Windows 10.

In order to play media in a web browser without plug-in support, media may be transmitted using Moving Picture Experts Group Dynamic Adaptive Streaming over Hypertext Transfer Protocol (MPEG-DASH), which is a protocol supported by Hypertext Markup Language version 5 (HTML5) Media Source Extensions (MSE), and performing decoding using the HTML5 video element. By using this method, it is possible to play media with relatively good performance using only code embedded in the web browser without using a plug-in.

However, using the HTML5 video element is not without its limitations. Since a MPEG-DASH container is used for media transmission, an initial delay may occur while loading the video in the container. Also, the requirement for a transmitting unit to transmit media according to the container of MPEG-DASH may cause compatibility issues and a limited number of supported video formats.

Meanwhile, there are at least two different modes of playing media in a web browser: live streaming of streaming media captured in real time and playback of streaming media stored in a server. There are following limitations in live streaming and playback using only the HTML5 video element. First, due to the container-based MPEG-DASH stream, the HTML5 video element may not be suitable for live streaming, such as a video surveillance system, in which an initial delay may be unacceptable. Second, in the case of streaming pre-recorded media, the HTML5 video element can be used because it is relatively free from real-time constraints. However, a compatibility issue may occur when performing streaming using the Real-Time Streaming Protocol/Real-time Transport Protocol (RTSP/RTP) scheme in a previously installed apparatus, and due to limitations to a supported codec of a video tag.

Accordingly, there is a demand for an apparatus and method capable of playing media seamlessly on a web browser according to a streaming mode without the above-described problems.

SUMMARY

One or more exemplary embodiments provide a method and apparatus for playing media in a web browser without using a plug-in.

Aspects of the present disclosure also selectively provide a media playing method and apparatus suitable for live streaming and recorded streaming in a web browser.

Aspects of the present disclosure also provide a media playing method and apparatus capable of ensuring a real-time property in the case of live streaming.

Aspects of the present disclosure also provide a media playing method and apparatus capable of playing media using code embedded in a web browser without modifying a media service apparatus using an RTSP/RTP protocol in the case of recorded media streaming.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an exemplary embodiment, there is provided a media streaming apparatus for playing media on a web browser. The media streaming apparatus may include a receiving unit configured to receive media data by using a communication protocol which supports web services, the media data being generated by a media service apparatus; a first media restoring unit configured to decode the media data by a first decoder written in a script which can be parsed by the web browser; a second media restoring unit configured to decode the media data by a second decoder embedded in the web browser; and an output unit configured to output the media data decoded by at least one of the first media restoring unit and the second media restoring unit. The media data may be decoded by the at least one of the first media restoring unit and the second media restoring unit based on a streaming mode.

According to an aspect of an exemplary embodiment, there is provided a media service apparatus for transmitting one of real-time live media data and stored media data to a media streaming apparatus. The media service apparatus may include a playing module storage unit configured to store a script module for playing the one of the real-time live media data and the stored media data on a web browser of the media streaming apparatus, the script module being written in a script which can be parsed by the web browser; a playing module transmitting unit configured to transmit the script module to the media streaming apparatus in response to connecting to the media streaming apparatus; a packetizing unit configured to packetize the one of the real-time live media data and the stored media data to generate a transmission packet; and a web server configured to establish a communication session with the media streaming apparatus and transmit the transmission packet to the media streaming apparatus in response to a streaming request from the media streaming apparatus.

According to an aspect of an exemplary embodiment, there is provided a non-transitory computer-readable storage medium storing a computer program for performing a method of transmitting one of real-time live media data and stored media data to a media streaming apparatus. The method may include storing a script module for playing the one of the real-time live media data and the stored media data on a web browser of the media streaming apparatus, the script module being written in a script which can be parsed by the web browser; transmitting the script module to the media streaming apparatus in response to connecting to the media streaming apparatus; packetizing the one of the real-time live media data and the stored media data to generate a transmission packet; establishing a communication session with the media streaming apparatus; and transmitting the transmission packet to the media streaming apparatus by a web server in response to a request from the media streaming apparatus for one of live streaming and recorded streaming.

By selectively providing a media playing method for live streaming and recorded media streaming, it is possible to achieve media playback suitable for each streaming mode. More specifically, in the case of live streaming, it is possible to play media without an initial delay, and in the case of recorded media streaming, it is possible to perform high-performance media playback using a decoder embedded in a web browser as well as media playback with no initial delay.

Further, by implementing container creation logic in the media streaming apparatus, it is possible to play media with the media service apparatus without a compatibility issue related to the container format with the media service apparatus. Accordingly, media can be played using a decoder embedded in a web browser without modifying the media service apparatus using the RTSP/RTP protocol. In the case of transmitting media data by the RTSP/RTP scheme instead of MPEG-DASH, since the load imposed on the server is small, even the media service apparatus having a shortage of resources can transmit media directly to the media streaming apparatus.

Further, by using a decoder and a renderer embedded in a web browser or implemented as script code that can be parsed in HTML5, it is possible to play media without a plug-in module such as ActiveX or NPAPI.

The effects of the exemplary embodiments are not limited to the above-described effects and other effects which are not described herein will become apparent to those skilled in the art from the following description.

BRIEF DESCRIPTION OF THE DRAWINGS

The above and/or other aspects and features will become more apparent by describing in detail exemplary embodiments thereof with reference to the attached drawings, in which.

DETAILED DESCRIPTION

Figure 1A:
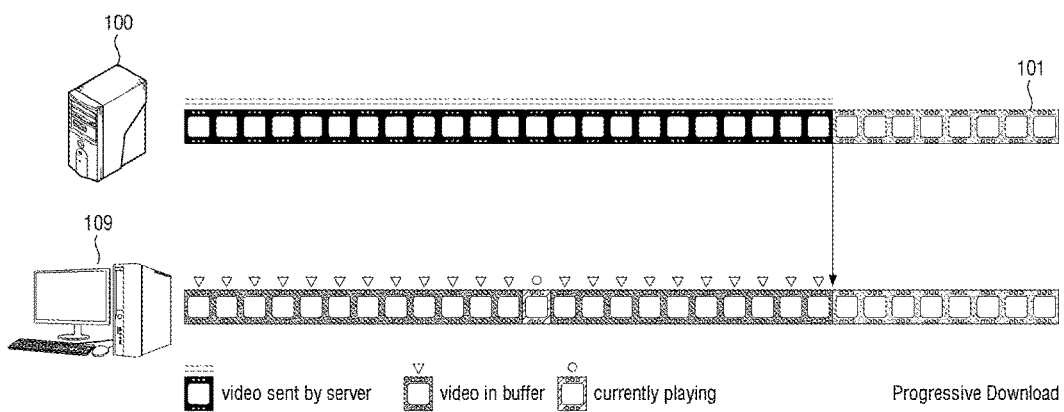
FIGS. 1A to 1C are exemplary diagrams for explaining a conventional media data transmission protocol on the server side.

Reference will now be made in detail to exemplary embodiments with reference to the accompanying drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

The term "streaming" as used herein refers to a method of playing media (e.g., audio, video, etc.) that originates from a remote device where the playback may be initiated after only partially downloading (e.g., buffering) the media without having to download and store the entire content in a local storage first. The term "live streaming" (also referred to as "live media") as used herein refers to a method in which a local device plays media, which is being captured at a remote device in real time, on a web browser or an application. For example, live events such as sporting events, concerts, performances, news broadcast, etc. may be live streamed while the images and/or sound are being captured. Live streaming does not necessarily imply that the events are being streamed as they happen, but may include a time delay (e.g., a few seconds). The term "recorded streaming" as used herein refers to a method in which a local device plays a streaming media (e.g., image, audio, video, etc.) that is pre-recorded and stored at a remote device. For example, video on-demand (VOD) services may allow a local device to play, on a web browser, a movie that is stored in a remote server. Recorded streaming (also referred to as non-live streaming or recorded media streaming) is different from live streaming in that the media being played back has been already recorded and stored before the playback begins.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting. As used herein, the singular forms "a", "an" and "the" are intended to include the plural forms as well and vice versa, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Various units and modules disclosed herein may be implemented with software, hardware, or a combination of both.

Hereinafter, the present disclosure will be described in more detail with reference to the accompanying drawings.

Figure 1B:
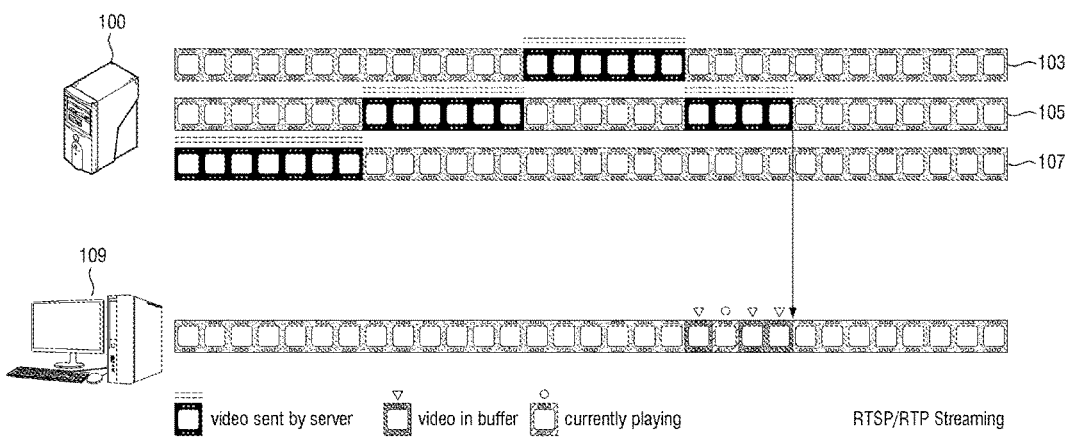
Figure 1C:
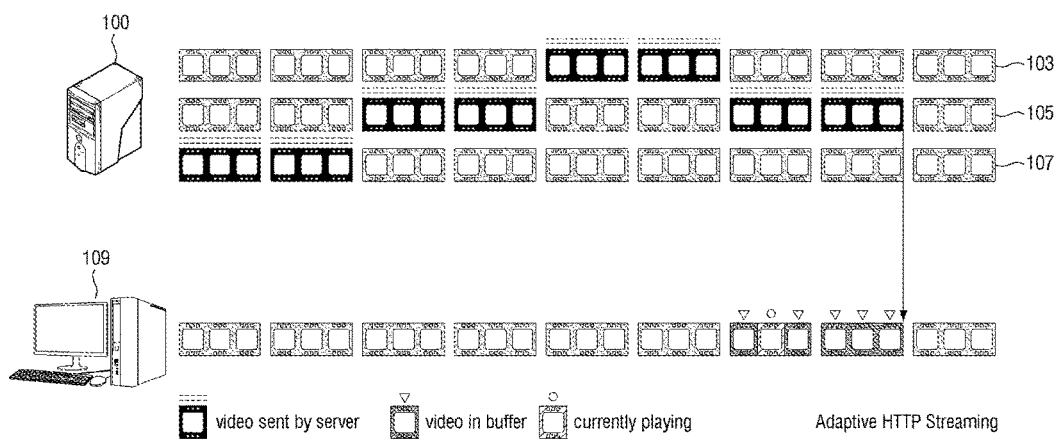

FIGS. 1A to 1C are exemplary diagrams for explaining a conventional media data transmission protocol on the server side.

FIG. 1A is an exemplary diagram for explaining a progressive download method. In the progressive download method, media data 101 is transmitted from a server 100 to a client 109 using a Hypertext Transfer Protocol (HTTP). In this case, a user of the client 109 can play the media data 101 based on meta data located in a header of the media data 101 even before the transmission of the media data 101 is completed.

The progressive download method is advantageous in that it can be easily implemented and playback is possible only by uploading the media data 101 to the server 100 and then notifying the client 109 of an address such as a Uniform Resource Locator (URL) to which the media data 101 is uploaded.

However, the progressive download method, which is a method of downloading the entire file, is disadvantageous in that it is inadequate in terms of security. Also, it has a disadvantage in that the network may be kept busy because it generates the same amount of traffic in the network as when the data is downloaded by the client 109. Further, there is a disadvantage in that the quality of the media data 101 cannot be changed once the downloading starts. That is, since it may be necessary but difficult to change the quality of the media data 101 according to the resource of the client 109 or the network environment, in the client 109 in a network environment where it is difficult to play high-quality media data, buffering may occur, which is not suitable for live streaming.

FIG. 1B is an exemplary diagram for explaining the RTSP/RTP streaming method. The RTSP/RTP streaming method stores multiple (e.g., three or four) video files encoded in different qualities (bit-rates) in the server 100 and provides a function of allowing the client 109 to change the quality during the course of the stream.

In the example of FIG. 1B, the media data 103 of low quality, media data 105 of medium quality, and media data 107 of high quality are stored in the server 100.

In the RTSP/RTP streaming method, rather than transmitting the entire media data, only a few frames of a portion that the client 109 wants to watch are transmitted. That is, if the viewer finds and clicks a scene to be watched, the media is played starting from the frame of the corresponding portion, and past frames are automatically deleted, which is desirable from a security perspective.

FIG. 1C is an exemplary diagram illustrating an adaptive HTTP streaming method. Referring to FIG. 1C, it can be seen that similar to the RTSP streaming method, the adaptive HTTP streaming method stores three pieces of media data 103, 105 and 107 in the server 100. However, fewer or more pieces of media data than three may be stored.

In the adaptive HTTP streaming method, the media data 103, 105 and 107 stored in the server 100 are divided into smaller pieces before being transmitted. The client 109 stitches the pieces into a continuous stream. That is, the server 100 fragmentizes the media data 103, 105 and 107 into units of a few seconds. The client 109 receives the fragmented media data 103, 105 and 107 and combines them into a continuous stream for use in playback.

Standards related to the adaptive HTTP streaming method include MPEG-DASH (International Organization for Standardization and the International Electrotechnical Commission (ISO/IEC) 23009-1:2012: Dynamic Adaptive Streaming over HTTP). In the case of the MPEG-DASH scheme, media data is transmitted using HTTP communication. While HTTP has an advantage of not having to implement separate streaming logic, it is not suitable for real-time media transmission because of the stateless characteristics of HTTP communication. It is also necessary to separately implement protocols that are necessary for controlling the playback of the media, such as play, forward, rewind, fast forward, fast rewind, etc.

Since the MPEG-DASH scheme uses a container obtained by processing frames corresponding to several seconds in the server 100, it takes time to load the media in the container. Therefore, the MPEG-DASH scheme has a disadvantage of creating an unavoidable delay (latency) of several seconds. In particular, in real-time monitoring, this delay may be disadvantageous.

In addition, the MPEG-DASH scheme can play media only with a codec supported by the web browser of the client 109. That is, since the MPEG-DASH scheme uses a video tag, only a codec supported by the video tag can be used, which creates a drawback of high dependency on the codec.

On the other hand, the RTSP/RTP scheme described with reference to FIG. 1B uses the RTSP/RTP protocol, according to which the media data is transmitted over a WebSocket and is compatible with HTML5 using the HTML5-based WebSocket protocol.

Figure 2:
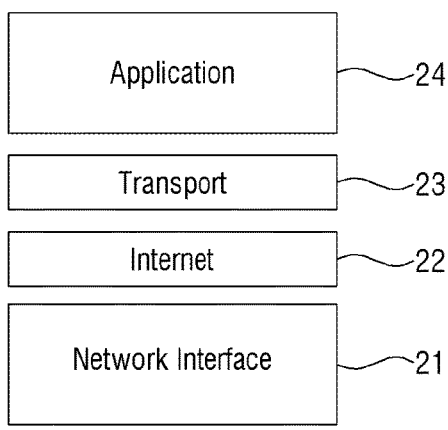
FIG. 2 is a diagram illustrating a Transmission Control Protocol/Internet Protocol (TCP/IP) 4-layer model that is hierarchically defined for communication between devices.
Figure 3:
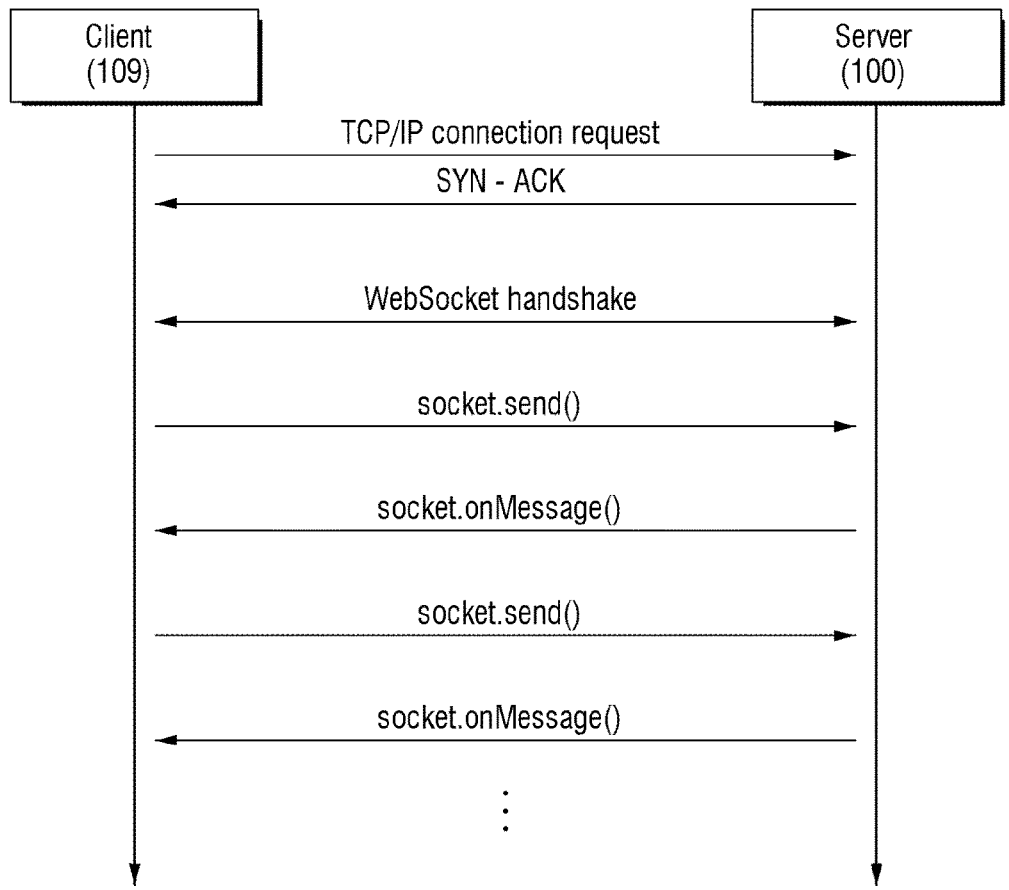
FIG. 3 shows an example of a process of transmitting and receiving data through a WebSocket connection.
Figure 4:
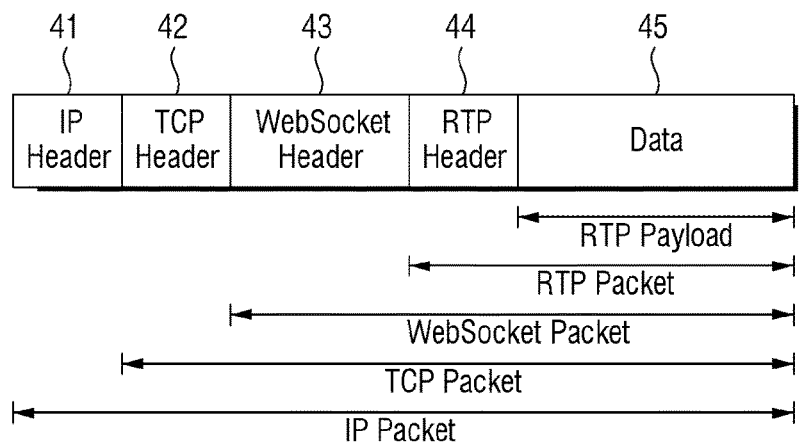
FIG. 4 is a diagram illustrating a structure of a communication packet which communicates with a server via a network interface.

FIGS. 2 to 4 are diagrams illustrating an RTSP/RTP protocol transmitted over a WebSocket used for communication between a server and a client.

FIG. 2 is a diagram illustrating a TCP/IP 4-layer model that is hierarchically defined for communication between devices. The four layers include a network interface layer 21, an Internet layer 22, a transport layer 23 and an application layer 24. Since the WebSocket connection in the RTSP/RTP protocol transmitted over the WebSocket is located at the top of the connection of the transport layer 23 between the server 100 and the client 109, in order to use the WebSocket connection, a TCP transport connection must first be established between the server 100 and the client 109. Once the WebSocket connection is established between the server 100 and the client 109, for example, via a 3-way handshake process, the WebSocket communication is performed by transmitting WebSocket packets. Hereinafter, a WebSocket connection will be described with reference to FIG. 3, and a WebSocket packet will be described with reference to FIG. 4.

FIG. 3 shows an example of a process of transmitting and receiving data through a WebSocket connection. This WebSocket connection may be established according to a WebSocket protocol that is part of the HTML5 standard. In particular, since the WebSocket connection supports persistent bidirectional communication, data can be continuously transmitted and received between the client 109 and the server 100 without being disconnected. As used herein with reference to WebSocket, "continuous" transmission and receipt of data may indicate the absence of a need to establish and/or terminate a connection or communication channel every time a data packet is transmitted. Instead, once a WebSocket connection or communication channel is established, the client 109 and the server 100 may exchange WebSocket data either uninterruptedly or intermittently until the WebSocket connection is terminated. In other words, a continuous transmission of data may not necessarily imply a data transmission without pause or interruption.

Referring to FIG. 3, the client 109 transmits a TCP/IP connection request message to the server 100, and the server 100 accepts it and transmits a TCP response message (SYN-ACK) to the client 109, thereby establishing a TCP/IP connection. A TCP transport connection may be formed by a pair of a local TCP socket and a remote TCP socket. Each TCP socket is defined by at least an identifier such as a port number and an Internet Protocol (IP) address. Of course, it is also possible to establish a User Datagram Protocol/IP (UDP/IP)-based connection between them instead of the TCP/IP-based connection.

Then, when the WebSocket connection is established through a handshake process between the client 109 and the server 100, continuous data transmission/reception between them can be performed thereafter. That is, the client 109 transmits a media streaming request to the server 100 in the form of a transmission WebSocket packet (socket.send), and the server 100 transmits a media stream to the client 109 in the form of a response WebSocket packet (socket.onMessage). This process can be performed continuously between them until media stream transmission is completed or terminated.

FIG. 4 is a diagram illustrating a structure of a communication packet which communicates with the server via the network interface 21. When an RTP header 44 is added to an RTP payload corresponding to data 45, they become an RTP packet. The RTP packet is equal to a WebSocket payload, and a WebSocket header 43 is added to the RTP packet to become a WebSocket packet. The WebSocket packet is equal to a TCP payload, and a TCP header 42 is added to the WebSocket packet to become a TCP packet. Finally, the TCP packet is equal to an IP payload, and an IP header 41 is added to the TCP packet, thereby generating a communication packet, that is, an IP packet. The process of generating the IP packet and a process of removing each header are performed in both the server 100 and the client 109.

Since the communication between the client 109 and the server 100 is performed through a HTML5-based WebSocket protocol, a module responsible for RTSP/RTP transmission/reception control, a module responsible for decoding and rendering, and the like can be implemented by script code that can be parsed in HTML5. According to an aspect of an exemplary embodiment, RTSP/RTP transmission/reception control and decoding and rendering may be implemented by JavaScript code. Accordingly, media streaming using the RTSP/RTP protocol can be implemented in a web browser without needing to separately install a plug-in such as an ActiveX or NPAPI module as was done conventionally.

The RTSP/RTP protocol transmitted on the WebSocket has been described so far. Hereinafter, an apparatus and method for playing media captured at a remote place using the above-described protocol while varying the logic according to a playing method in a web browser will be described with reference to FIGS. 5 to 14.

Figure 5:
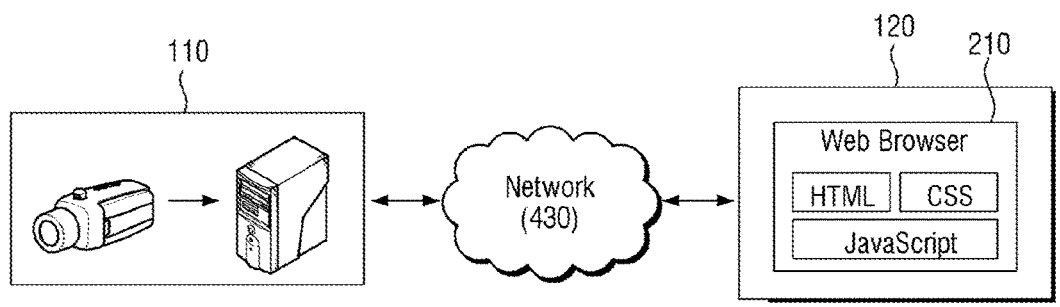
FIG. 5 shows an entire system for media playback in a web browser.

FIG. 5 shows an overview of a system for media playback in a web browser 210. In the system, media captured by a media service apparatus 110 is transmitted to a media streaming apparatus 120 (also referred to as a media playback apparatus or user devices) through a network 430.

The media service apparatus 110 includes a computing or processing device suitable for providing computing services to one or more media playback apparatuses. For example, the media service apparatus 110 includes a device, such as a network camera, a network video recorder (NVR) and a digital video recorder (DVR), capable of generating or storing a media stream and transmitting the media stream to user devices.

The media streaming apparatus 120 includes a computing or processing device suitable for interacting with the media service apparatus 110 or other computing user devices via the network 430. For example, the media streaming apparatus 120 may be a desktop computer, a mobile phone or smartphone, a personal digital assistant (PDA), a laptop computer, a set-top box, a digital media player, a media dongle, or a tablet computer.

The media service apparatus 110 and the media streaming apparatus 120 communicate with each other using the RTSP/RTP protocol transmitted over the WebSocket described above. When a WebSocket connection is established between the media service apparatus 110 and the media streaming apparatus 120, continuous data transmission/reception between them is performed thereafter.

Figure 6:
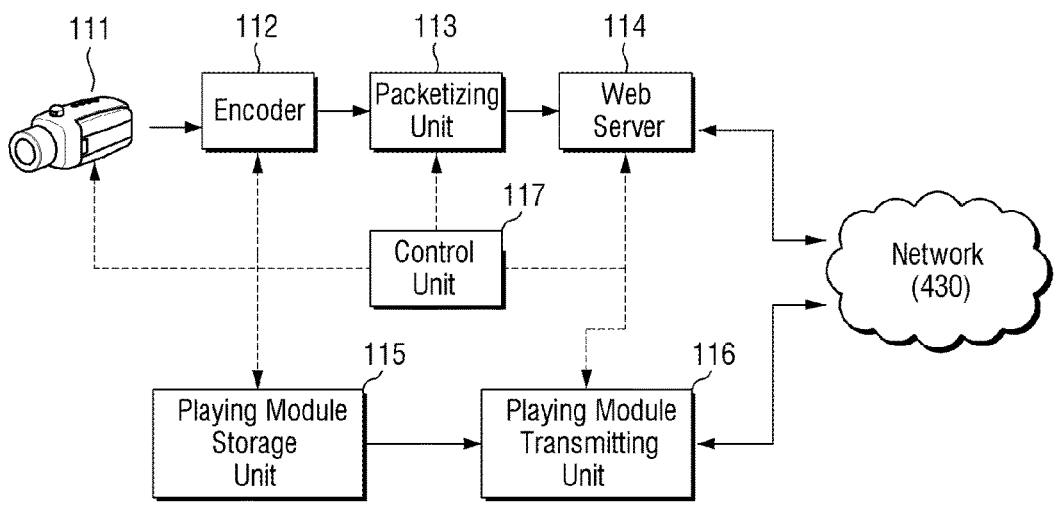
FIG. 6 shows an embodiment of a configuration of a media service apparatus.

FIG. 6 shows an embodiment of a configuration of the media service apparatus 110. In one embodiment, the media service apparatus 110 includes a real-time video camera 111, an encoder 112, a packetizing unit 113, a web server 114, a playing module storage unit 115, a playing module transmitting unit 116, and a control unit 117.

The real-time video camera 111 is a means for capturing media in real time, and the capturing includes a case of performing both video capturing and audio recording and a case of performing only video capturing.

The encoder 112 is configured to compress and encode the media captured by the real-time video camera 111. The encoding of the encoder 112 is not necessarily performed using a specific codec supported by a decoder embedded in the web browser, but may be performed with any codec.

The packetizing unit 113 packetizes the encoded media data to generate a transmission packet. The packetization means dividing the media data into appropriate lengths to facilitate transmission via the network 430 or, collectively assigning control information, such as a receiving address, to each data in an appropriate length if the media data is short. In this case, the control information is located in the header of the packet.

The packetizing unit 113 may perform packetization of the media data according to a streaming mode requested by the media streaming apparatus 120, a profile element of the media played by the media streaming apparatus 120, and a codec applied to the media. The profile elements (e.g., properties) include a resolution, a frame rate, and the like.

When the media streaming apparatus 120 requests live streaming as a streaming mode, the packetizing unit 113 may generate a transmission packet for each frame of the media. In the case of live streaming, the media streaming apparatus 120 performs decoding on a frame-by-frame basis through a decoder implemented as a script that can be parsed by a web browser, thereby enabling playback without an initial delay. In this case, the script that can be parsed by the web browser may be JavaScript.

When the media streaming apparatus 120 requests recorded streaming as a streaming mode, the packetizing unit 113 may generate a transmission packet on a frame-by-frame basis or in a container format, each container including a plurality of video frames. The format of the transmission packet may be determined according to the profile element of the media of the media streaming apparatus 120 and the codec applied to the media.

More specifically, the packetizing unit 113 may generate a transmission packet in a container format if the profile element of the media is larger than a threshold value and generate a transmission packet on a frame-by-frame basis if the profile element of the media is smaller than the threshold value in response to the playback request. In this case, the threshold value may be a specific reference value for determining the playback performance of the media streaming apparatus 120. For example, if the media profile element is a resolution, it may be set to a specific resolution value for determining whether the decoder of the media streaming apparatus 120 smoothly performs decoding. The threshold value may be adjusted according to the performance of the computing device during media playback in the media streaming apparatus 120

Further, in response to the playback request, the packetizing unit 113 may generate a transmission packet in a container format if the codec format applied to the media is supported by a decoder embedded in the web browser of the media streaming apparatus 120, and generate a transmission packet in a container format if not supported. Accordingly, in the case of media encoded with a codec not supported by the decoder embedded in the web browser, decoding is performed on a frame-by-frame basis using a decoder written in a script that can be parsed by the web browser of the media apparatus 120.

The web server 114 establishes a communication session with the media streaming apparatus 120. That is, a Web-Socket connection is established between the web server 114 of the media service apparatus 110 and the media streaming apparatus 120 through a handshake process between them.

Thereafter, according to the request of the media streaming apparatus 120, the transmission packet generated by the packetizing unit 113 is transmitted through the web server 114.

The playing module storage unit 115 is a module for storing a script module necessary to play media in the media streaming apparatus 120. The script module allows the media streaming apparatus 120 to play media in a web browser in an HTML5 environment without installing a plug-in or a separate application program, using code written in a script that can be parsed by a web browser. The script module may be code written in JavaScript according to an aspect of an exemplary embodiment. The script module will be described later with reference to FIGS. 8 and 9.

The playing module transmitting unit 116 is a module for transmitting the script module stored in the playing module storage unit 115 to the media streaming apparatus 120. The playing module transmitting unit 116 transmits the script module in response to a case where the media streaming apparatus 120 connects to the media service apparatus 110 via the web browser.

The control unit 117 is a module for controlling other configuration modules in the media service apparatus 110. For example, when the media streaming apparatus 120 connects to the web server 114 through the network 430, the script module stored in the playing module storage unit 115 is transmitted to the media streaming apparatus 120 through the playing module transmitting unit 116. In this case, the control unit 117 sends/receives signals to/from the respective modules to control the operation to be performed smoothly.

Figure 7:
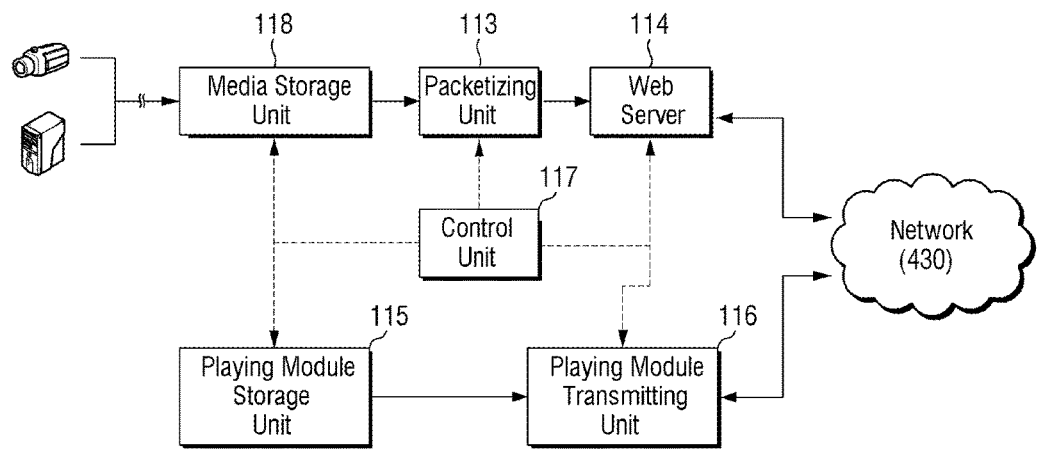
FIG. 7 shows another exemplary embodiment of the configuration of the media service apparatus.

FIG. 7 shows another exemplary embodiment of the configuration of the media service apparatus 110. The media service apparatus 110 of FIG. 6 represents an exemplary embodiment for transmitting real-time live video using the real-time video camera 111, and the media service apparatus 110 of FIG. 7 represents an exemplary embodiment for transmitting video stored in a media storage unit 118.

The media storage unit 118 includes a network video recorder (NVR) or a personal video recorder (PVR). However, the exemplary embodiment of FIG. 7 will be described in conjunction with the network video recorder. The media storage unit 118 receives media data from a camera or a server and compresses (e.g., encodes, encrypts) and stores the received media data. When there is a request for transmission of the stored media data from the media streaming apparatus 120, the media service apparatus 110 packetizes the media data stored in the media storage unit 118 in the packetizing unit 113 and transmits the packetized data through the web server 114. In the exemplary embodiment of FIG. 7, the packetizing unit 113, the web server 114, the playing module storage unit 115, the playing module transmitting unit 116 and the control unit 117 among the configuration modules of the media service apparatus 110 have been described in the exemplary embodiment of FIG. 6.

Figure 8:
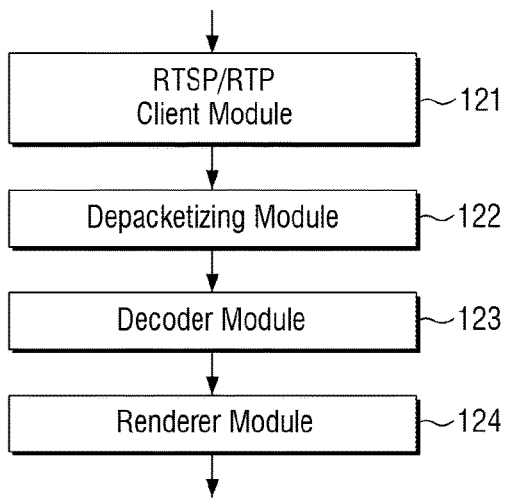
FIG. 8 shows an exemplary embodiment of a script module of a playing module storage unit.

FIG. 8 shows an embodiment of the script module of the playing module storage unit 115. In the exemplary embodiment of FIG. 8, the script module includes an RTSP/RTP client module 121, a depacketizing module 122, a decoder module 123 and a renderer module 124. In the exemplary embodiment of FIG. 8, the script module is implemented in JavaScript.

The RTSP/RTP client module 121 is configured to support RTSP/RTP communication with the media service apparatus 110. Conventionally, it is impossible to process media according to the RTSP/RTP protocol on a web browser without a plug-in. When using the RTSP client 120, it is possible to reliably receive media data transmitted through the RTSP/RTP protocol even if the web browser uses an HTTP scheme.

The depacketizing module 122 depacketizes a packet transmitted from the media service apparatus 110. Depacketization is a reverse process of packetization. In other words, packetization refers to a process of dividing media data into smaller pieces having appropriate lengths to form packets, while depacketization refers to a process of restoring the media data to a state prior to the packetization by putting the pieces (i.e., packets) together again.

The decoder module 123 decompresses (e.g., decodes, decrypts) the encoded media data. The decoder module 123 may be implemented in JavaScript similarly to other modules of the script module. Since the decoder module 123 is implemented in JavaScript, unlike a decoder that is embedded in the web browser, it is possible to perform decoding in a wider variety of codecs instead of a limited set of supported codecs. It is also possible to perform decoding on a frame-by-frame basis.

When the decoder module 123 is implemented in JavaScript, for example, it can be represented by the following exemplary code.

```
function HevcDecoder ( ) {
  var _name = "HevcDecoder";
  var self = this;
  this._decoderParameters = null;
  this._isRequestActive = false;
  this._player = null;
  this._requestContext = null;
  this._requestContextQueue = [ ];
  this.pushRequestContext = function (requestContext) {
    self._requestContextQueue.push(requestContext);
  };
  this.decode = function ( ) {
    if (self._isRequestActive) {
      return;
    }
    if (self._requestContextQueue.length) {
      self._isRequestActive = true;
      self._requestContext = self._requestContextQueue.pop( );
      self._playStream(self._requestContext.stream);
    }
  };
  this._createDecodeCanvas = function(parentElement) {
    self.canvas = document.createElement("canvas");
    self.canvas.style.display = "none";
    self.canvas.id = "decode-canvas";
    parentElement.appendChild(self.canvas);
    self.ctx = self.canvas.getContext("2d");
  };
  this._playStream = function (buffer) {
    this._reset( );
    this._handleOnLoad(buffer);
  }
  this._onImageDecoded = function (image) {
    var width = image.get_width( );
    var height = image.get_height( );
    this.canvas.width = width;
    this.canvas.height = height;
    this._imageData = this.ctx.createImageData(width, height);
    image,display(this._imageData, function (displayImageData) {
      var itemId =
self._requestContext.itemIds[self._requestContext.currentFrameIndex];
      var payload = self._requestContext.payload;
      if (height > payload.displayHeight) {
        payload.displayHeight = height;
      }
      if (!(itemId in self._requestContext.dependencies)) {
        if (width > payload.displayWidth) {
          payload.displayWidth = width;
        }
        payload.frames.push({
          canvasFrameData: displayImageData.data,
```

-continued

```
          itemId: itemId,
          width: width,
          height: height
        });
      }
      self._requestContext.currentFrameIndex++;
      if (self._requestContext.currentFrameIndex >=
self._requestContext.itemIds.length) {
        self._requestContext.callback(payload);
        self._isRequestActive = false;
        self.decode( ); // Decode next queued request
      }
    });
  };
  this._createDecodeCanvas(document.documentElement);
  this._reset( );
}
```

The renderer module 124 is configured to render video and display video on an output device such as a monitor or the like. The renderer module 147 converts video in a YUV format into video in a RGB format using WebGL. WebGL is a web-based graphical library that is available through JavaScript and allows the creation of a 3D graphical interface.

Since the script module of FIG. 8 uses a JavaScript decoder, it is possible to perform decoding on a frame-by-frame basis without being limited to the codec format of video. However, the decoding performance may deteriorate rapidly in high-resolution video due to the dynamic characteristics of JavaScript. Therefore, the script module of FIG. 8 is suitable for playback of video whose profile element does not exceed the threshold value and video which is encoded with a codec not supported by a decoder embedded in a web browser in the case of live streaming and playback without an initial delay.

Figure 9:
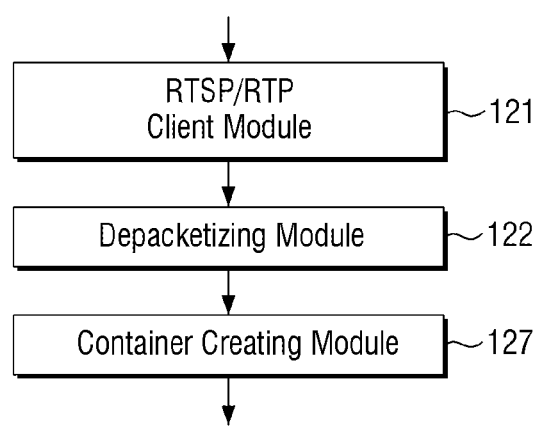
FIG. 9 shows another exemplary embodiment of the script module of the playing module storage unit.

FIG. 9 shows another exemplary embodiment of the script module of the playing module storage unit 115. In the embodiment of FIG. 9, the script module includes the RTSP/RTP client module 121, the depacketizing module 122, and a container creating module 127. Further, in the exemplary embodiment of FIG. 9, the script module is implemented in JavaScript. The RTSP/RTP client module 121 and the depacketizing module 122 have been described with reference to FIG. 8.

Referring to FIG. 9 in more detail, the script module of FIG. 9 includes the container creating module 127 implemented in JavaScript unlike the example shown in FIG. 8. The container creating module 127 is configured to generate a container by collecting frames when the depacketized media data is not packaged on a container basis in the depacketizing module 122.

When a video tag is used as an example of a decoder embedded in a web browser, the media playback performance is higher than that of a decoder implemented in JavaScript. However, in the case of conventional MPEG-DASH, since a transmitting unit creates a container and transmits media while the media is loaded in the container, container creation logic must be implemented in the transmitting unit.

If the previously installed transmitting unit does not provide a function of creating a container supporting MPEG-DASH, media must be transmitted separately through a server having a container creation function. Accordingly, by moving the container creating module 127 to the media streaming apparatus 120, it is possible to solve a compatibility problem without modifying the existing equipment.

When using the script module of FIG. 9, even if an RTSP/RTP protocol transmitted on a WebSocket is used, a video tag can be used as an example of a decoder embedded in a web browser in the media streaming apparatus 120 without a compatibility problem. In general, the method of FIG. 8 can also be used for recorded media streaming. However, the decoder implemented in JavaScript may be inferior in performance due to limitations of a dynamic language such as JavaScript. In addition, when playback is performed, a real-time property is not required due to its characteristics. That is, it is less important to perform decoding on a frame-by-frame basis. When using a video tag, an initial delay may occur due to the container format, but it is possible to perform decoding with high frames per second (FPS) and high resolution video with excellent performance. Therefore, the script module of FIG. 9 is suitable for a playback when the profile element of the media exceeds the threshold value and when the media is encoded in the format supported by the video tag.

Figure 10:
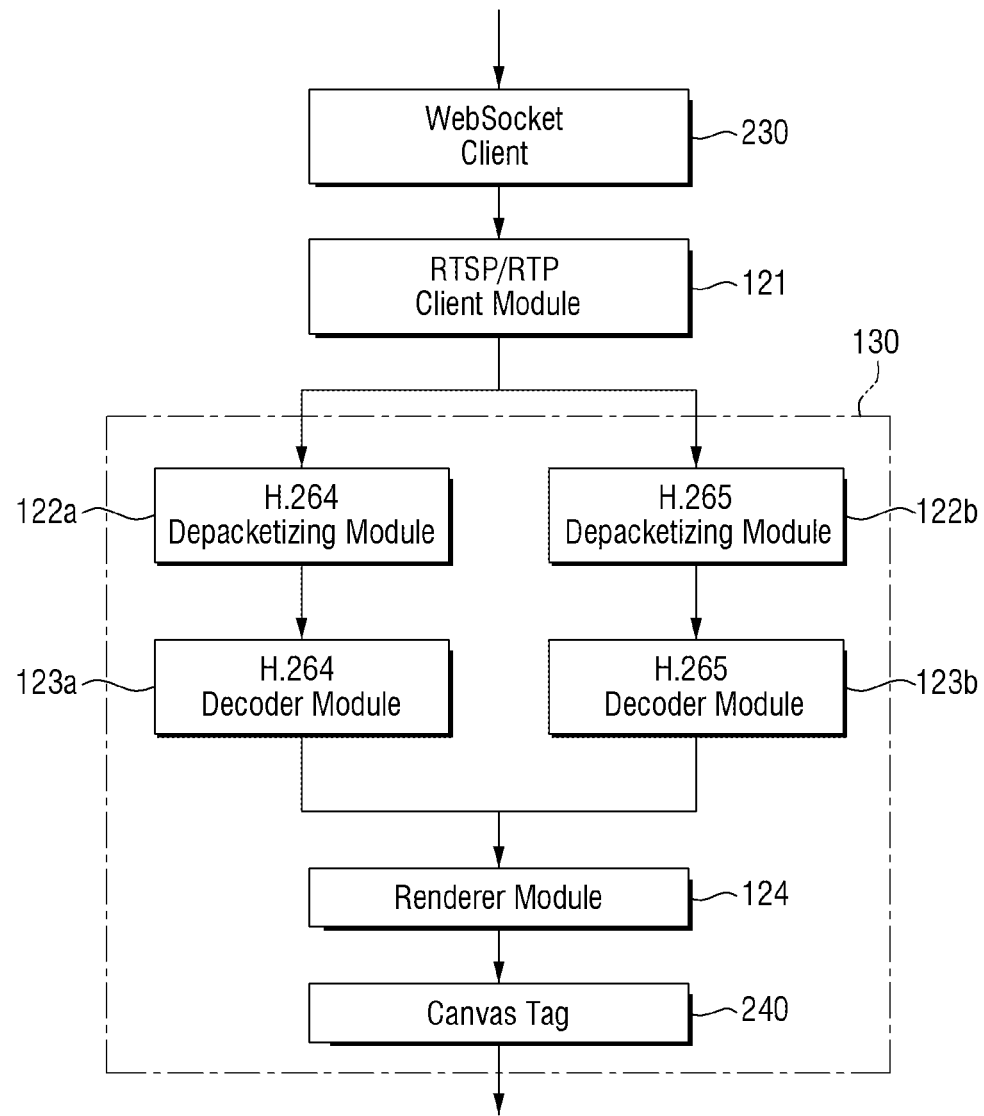
FIG. 10 is an exemplary diagram illustrating a media streaming apparatus for live streaming or recorded streaming using JavaScript, which is an embodiment of script code that can be parsed in a web browser.

FIG. 10 is an exemplary diagram illustrating the media streaming apparatus 120 for live streaming or recorded streaming using JavaScript, which is an example of script code that can be parsed in a web browser. In the exemplary embodiment of FIG. 10, the configuration of modules for playing video encoded with the codecs of H.264 and H.265 will be described.

The RTSP/RTP client module 121, an H.264 depacketizing module 122a, an H.265 depacketizing module 122b, an H.264 decoder module 123a, an H.265 decoder module 123b, and the renderer module 124 in FIG. 10 are modules configured to receive the client module of the exemplary embodiment of FIG. 8 from the playing module transmitting unit 116 of the media service apparatus 110.

A WebSocket client 230 and the RTSP/RTP client module 121 constitute a receiving unit. The WebSocket client 230 is a module for establishing a WebSocket connection with the web server 114 of the media service apparatus 110. The media streaming apparatus 120 and the media service apparatus 110 send and receive a transmission packet through a handshake between the WebSocket client 230 and the web server 114, respectively.

The RTSP/RTP client module 121 is configured to support RTSP/RTP communication in the web browser 210 of the user as described in the exemplary embodiment of FIG. 8. Accordingly, the user can play the media through the web browser 210 in the HTML5 environment using the RTSP/RTP protocol without installing a separate plug-in.

The transmission packet that has passed through the WebSocket client 230 and the RTSP/RTP client module 121 is decoded by a first media restoring unit 130. In the exemplary embodiment of FIG. 9, since the video encoded in H.264 or H.265 is targeted, the depacketizing module 122 includes an H.264 depacketizing module 122a and an H.265 depacketizing module 122b, and the decoder module 123 includes an H.264 decoder module 123a and an H.265 decoder module 123b. The video encoded in H.264 is depacketized and decoded through the H.264 depacketizing module 122a and the H.264 decoder module 123a. The video encoded in H.265 is depacketized and decoded through the H.265 depacketizing module 122b and the H.265 decoder module 123b.

In the exemplary embodiment of FIG. 10, only the H.264 codec and the H.265 codec are illustrated. However, by additionally implementing a depacketizing module and a decoder module implemented in JavaScript for each additional codec, various other codecs can also be supported.

Since the decoder module is implemented in JavaScript in the first media restoring unit 130, it is possible to decode video encoded with the H.265 codec which is not supported by a video tag, which is an example of a decoder embedded in the current web browser.

In addition, decoding in the H.264 JavaScript decoder and the H.265 JavaScript decoder is performed on a video on a frame-by-frame basis. The user can play the video in a live streaming mode without an initial delay due to the frame-by-frame processing method.

The video depacketized and decoded in conformity with the codec is outputted to the web browser through the renderer module 124 and a canvas tag 240. The canvas tag 240 corresponding to an output unit is an element of HTML5 that allows 2D shapes and bitmap images to be dynamically rendered. That is, the canvas tag 240 can be regarded as a paint program (e.g., a renderer) on the web browser. Since it is a function supported by most of the latest versions of web browsers, the media may be processed on a frame-by-frame basis by the decoder implemented in JavaScript and displayed on the web browser by using the canvas tag 240.

Through the exemplary embodiment of FIG. 10, it is possible to stream the media captured by the media service apparatus 110 in real time and play the media without depending on a plug-in. Accordingly, it is possible to provide an environment in which media can be played in real time without worrying about security issues associated with the use of a plug-in, in conformity with the trend among web browser developers to discontinue support for plug-ins.

Also, the web server 114 transmits media data in the RTSP/RTP protocol transmitted on the WebSocket which is not disconnected through the WebSocket client 230 and the RTSP/RTP client module 121. The media streaming apparatus 120 processes the media data transmitted using JavaScript on a frame-by-frame basis. Accordingly, the delay time can be reduced to several tens of milliseconds.

Further, since the decoder is implemented in JavaScript, it does not require a separate container and can support an additional codec such as H.265. Therefore, the scalability of codec support is improved over the MPEG-DASH scheme.

Figure 11:
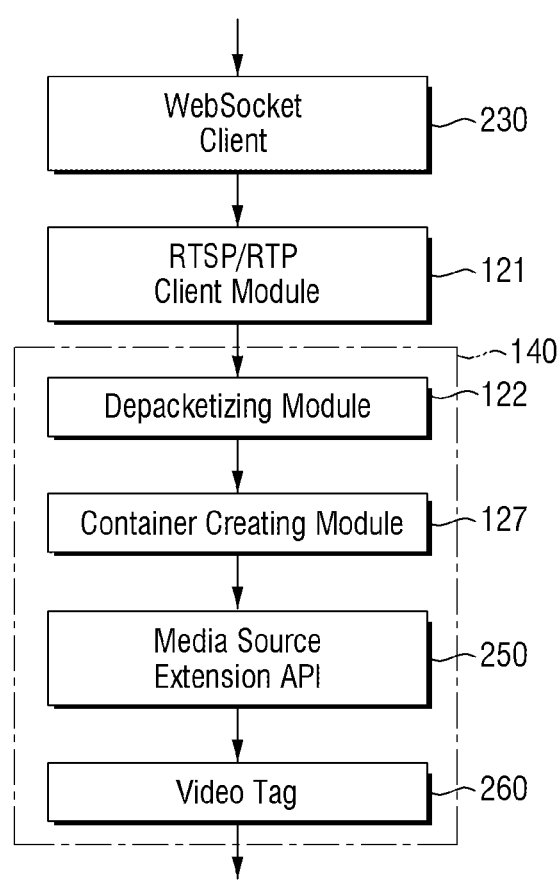
FIG. 11 is an exemplary diagram illustrating the media streaming apparatus for recorded streaming using a video tag, which is an embodiment of a decoder embedded in a web browser.

FIG. 11 is an exemplary diagram illustrating the media streaming apparatus 120 for recorded streaming using a video tag 260, which is an embodiment of a decoder embedded in a web browser. In the embodiment of FIG. 11, a method of playing a video encoded with the H.264 codec in a recorded streaming mode is described. Further, the video tag 260 is used as an example of a decoder embedded in a web browser.

In FIG. 11, the RTSP/RTP client module 121, the depacketizing module 122, and the container creating module 127 are modules configured to receive a script module as illustrated in FIG. 9 from the playing module transmitting unit 116 of the media service apparatus 110.

The WebSocket client 230 and the RTSP/RTP client module 121 constitute a receiving unit. The WebSocket client 230 is the same module as the module described in the exemplary embodiment of FIG. 10. The RTSP/RTP client module 121 is configured to support RTSP/RTP communication in the web browser 210 of the user. Accordingly, the user can play the media in a recorded streaming mode through the web browser in the HTML5 environment using the RTSP/RTP protocol without installing a separate plug-in.

The video that has passed through the receiving unit is decoded by a second media restoring unit 140. The video is depacketized by the depacketizing module 122, and if the depacketized video is not transmitted in the container format, the container creating module 127 is configured to create a container by collecting frames. The video that has passed through the container creating module 127 is transferred to an media source extension (MSE) 250 and the video tag 260 without a compatibility problem due to the container format.

The MSE 250 is a JavaScript API for HTML5, which is created for video streaming playback using HTTP download. This technology, standardized by the World Wide Web Consortium (W3C), enables streaming playback on a gaming console, such as Xbox and PlayStation 4 (PS4), or a Chromecast media player.

The video tag 260 of the second media restoring unit 140 performs decoding and rendering so that the video is displayed on the screen. Since the H.264 codec is supported in the current video tag, the video encoded with the H.264 codec has been described as an example. However, codecs supported by other video tags and the extended codec format if the codec format supported by the video tag is extended in the future, it is possible to decode and render video through the exemplary embodiment of FIG. 11.

In the media streaming apparatus of FIG. 11, in order to provide a media playback environment of various functions as in the MPEG-DASH scheme, by installing a container function to be processed by the media service apparatus 110 in the web browser 210 of the media streaming apparatus 120, it is possible to play media through a video tag of HTML5 in a similar fashion as the conventional MPEG-DASH scheme.

So far, two exemplary embodiments of the media streaming apparatus have been described with reference to FIGS. 10 and 11. The media streaming apparatus of FIG. 10 is suitable for a playing method when media is encoded with a codec not supported by a video tag and when a media profile element does not exceed a threshold value due to dynamic characteristics of JavaScript and live streaming with no initial delay. The media streaming apparatus of FIG. 11 is suitable for a playing method when media is encoded with a codec supported by a video tag and when a media profile element exceeds a threshold value in view of excellent performance of a video tag. Therefore, when the media streaming apparatus of FIG. 10 or 11 is selectively used, it is possible to play media suitable for a live streaming or recorded streaming mode.

So far, a method of playing video in the media streaming apparatus 120 in a manner suitable for live streaming or recorded streaming has been described with reference to FIGS. 10 and 11. However, the playing method using JavaScript can be applied in the same way to audio.

Figure 12:
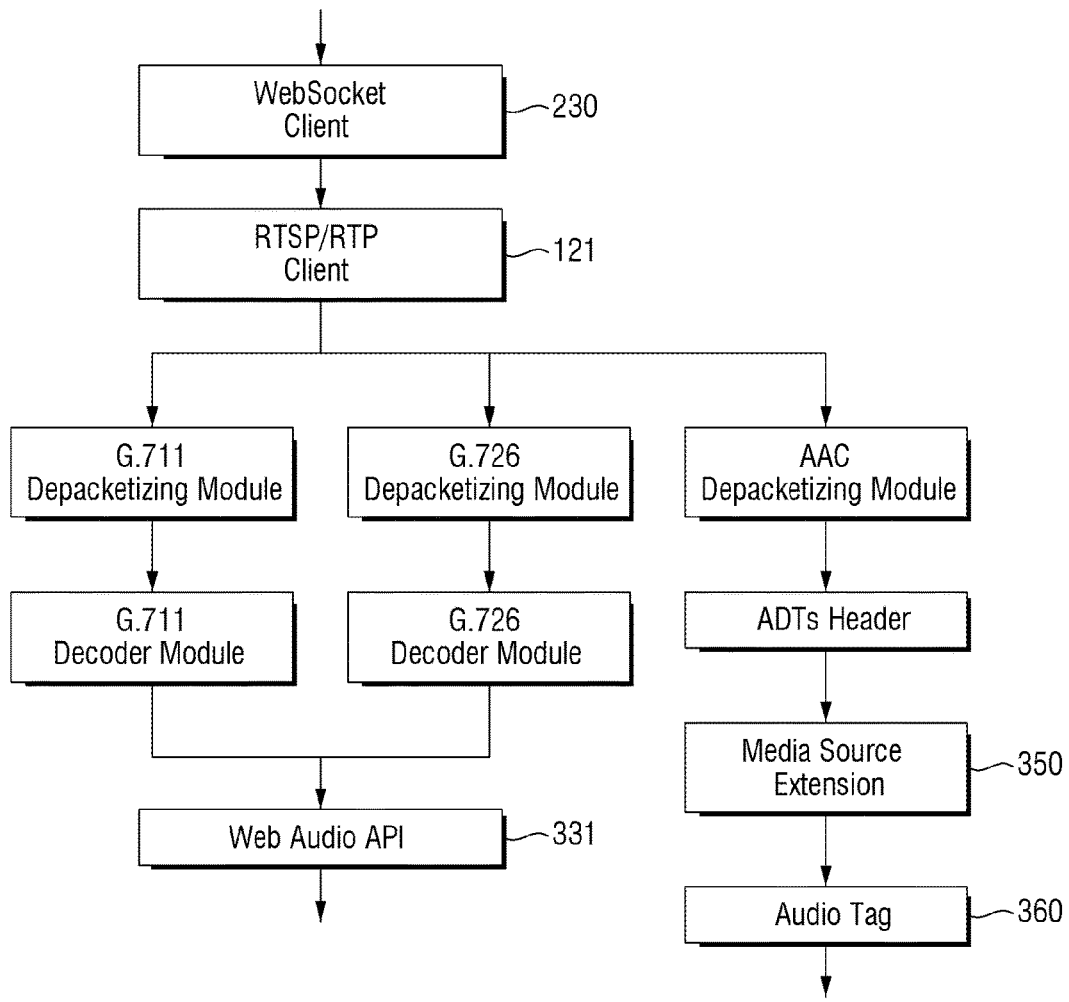
FIG. 12 is an exemplary diagram illustrating a process of implementing a method of playing audio using JavaScript in the media streaming apparatus according to an exemplary embodiment.

FIG. 12 is an exemplary diagram illustrating a process of implementing a method of playing audio using JavaScript in the media streaming apparatus 120 according to an exemplary embodiment.

The left side of FIG. 12 is an example for explaining a function for live streaming of audio as in the case of FIG. 9, and the right side of FIG. 12 is an example for explaining a function for playback as in the case of FIG. 11.

Also in FIG. 12, similar to FIG. 10, depending on the audio codec, audio can be decoded in real time with either the G.711 codec or the G.726 codec. Of course, in addition to the codecs illustrated in FIG. 12, a decoder for decoding another codec may be implemented in JavaScript. The audio decoded in real time is outputted through a web audio API 331 serving as an output unit.

Also in FIG. 12, similar to FIG. 11, the stored audio may be outputted after being decoded according to the codec using an MSE 350 for buffer management and using an audio tag 360, which is a decoder embedded in the web browser.

Up to now, a playing method according to live streaming and recorded streaming has been described with reference to FIGS. 10 to 12. The playing method of the media data is determined by a user input through a user interface. The user interface may be implemented as a graphical user interface (GUI) and may be operable via a remote connection.

Figure 13:
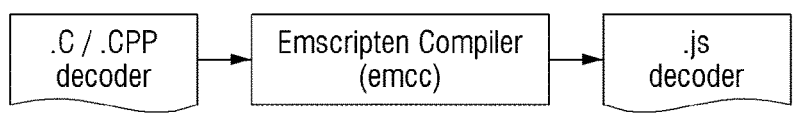
FIG. 13 is an exemplary diagram explaining a process of generating a script module implemented in JavaScript according to an exemplary embodiment.

FIG. 13 is an exemplary diagram explaining a process of generating a script module implemented in JavaScript according to an exemplary embodiment.

Referring to FIG. 13, a script module implemented in JavaScript may be implemented by converting a source written in the conventional C and C++ native code using a converter such as Emscripten to obtain JavaScript code that can be used in a browser.

When using a converter such as Emscripten, it is possible to obtain a decoder or a container implemented in JavaScript from conventional native code. Accordingly, an advantage may be achieved by reducing codec dependency.

Since JavaScript code is used instead of a plug-in, there is no need to be concerned with a browser's legacy support when transitioning to the new technology. In addition, there is no need to worry about whether to use the ActiveX interface or the NPAPI interface depending on the browser. That is, browser dependency may be reduced.

Figure 14A:
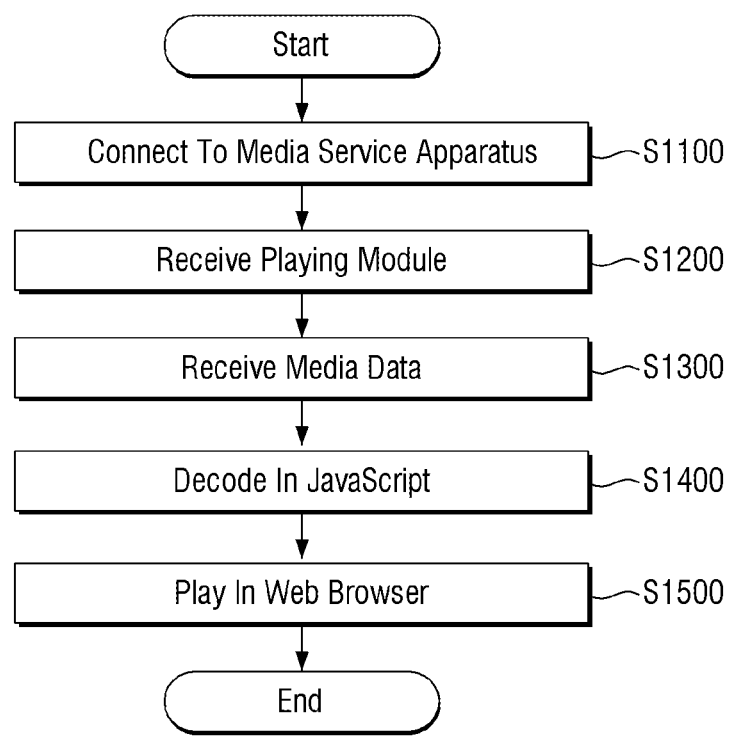
FIGS. 14A and 14B are flowcharts of a live streaming method and a playback method using JavaScript, respectively, according to an exemplary embodiment.
Figure 14B:
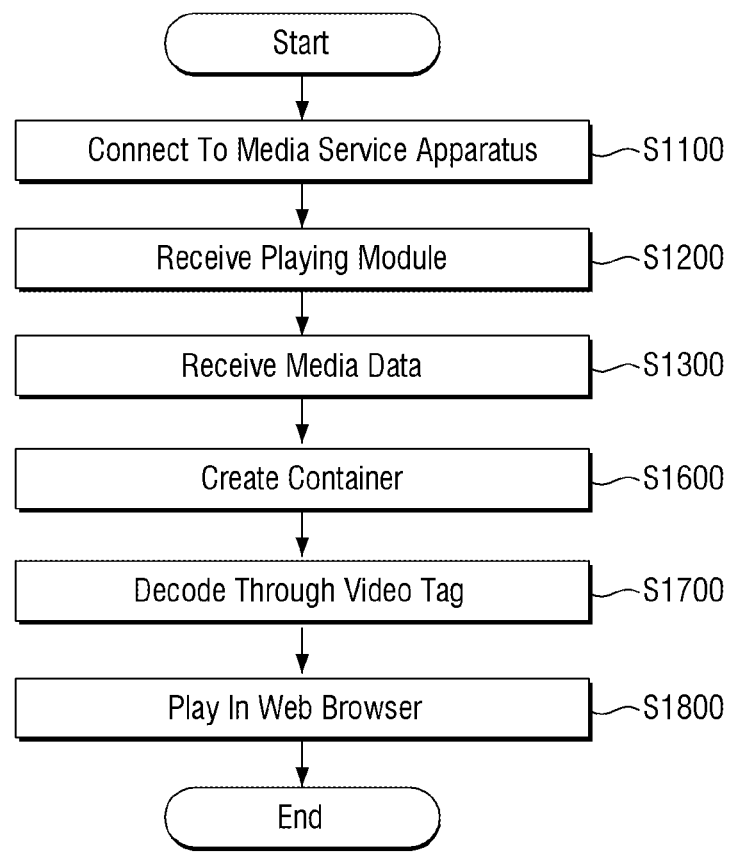

FIGS. 14A and 14B are flowcharts of a live streaming method and a recorded streaming method using JavaScript, respectively, according to an exemplary embodiment. A JavaScript decoder is used in FIG. 14A and a video tag decoder is used in FIG. 14B.

Referring to FIG. 14A, the media streaming apparatus 120 connects to the media service apparatus 110 through the web browser 210 (S1100). The media streaming apparatus 120 receives the script module stored in the playing module storage unit 115 from the media service apparatus 110 (S1200). The media data being captured in real time is received by the media streaming apparatus 120 using a WebSocket (S1300), and decoded using a decoder implemented in JavaScript (S1400). The decoded media can be played in real time in the user's web browser 210 through the renderer and the canvas tag 240 of HTML5 (S1500).

Referring to FIG. 14B, the media streaming apparatus 120 connects to the media service apparatus 110 through the web browser 210 (S1100). The media streaming apparatus 120 receives the script module stored in the playing module storage unit 115 from the media service apparatus 110 (S1200). The media data pre-recorded and stored in the media service apparatus 110 is received by the media streaming apparatus 120 using a WebSocket (S1300). If the video is not in the container format, a container is created with JavaScript (S1600). The media data may be decoded through the video tag 260 of HTML5 (S1700) and played in the web browser 210 of the media streaming apparatus 120 (S1800).

In the above description, the web browser includes not only a commonly known browser such as Google Chrome, Microsoft Explorer, Microsoft Edge, Mozilla Firefox, and Apple Safari installed on a desktop computer or mobile device, but also software applications that are created by using APIs or resources of the web browser.

Figure 15:
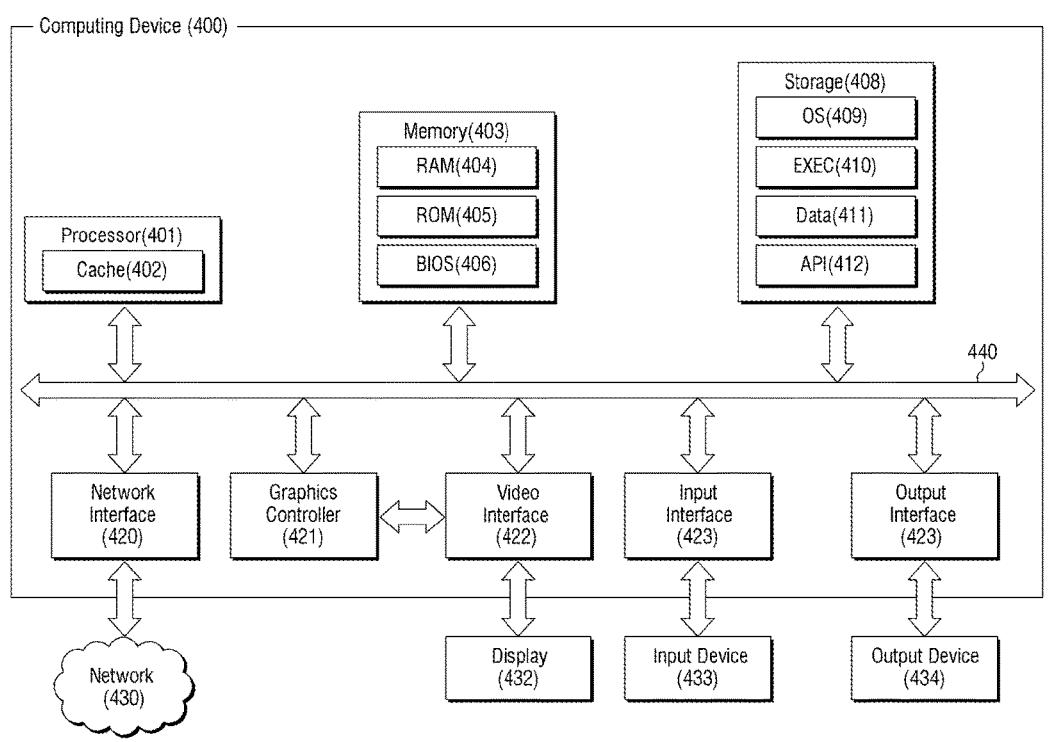
FIG. 15 is an exemplary diagram illustrating a computing device for implementing the media streaming apparatus.

The media streaming apparatus 120 shown in FIG. 5 may be implemented, for example, as a computing device 400 shown in FIG. 15. The computing device 400 may be, but is not limited to, mobile handheld devices (e.g., smartphones, tablet computers, etc.), laptop or notebook computers, distributed computer systems, computing grids or servers. The computing device 400 may include a processor 401, a memory 403 and a storage 408 that communicate with each other or with other elements via a bus 440. The bus 440 may be coupled to a display 432, at least one input device 433, and at least one output device 434.

All of these elements may be connected to the bus 440 directly or via one or more interfaces or adapters. The bus 440 is coupled to a wide variety of subsystems. The bus 440 may include a memory bus, a memory controller, a peripheral bus, a local bus, and a combination thereof.

The processor (e.g., a central processing unit (CPU)) 401 optionally includes a cache memory 402, which is a local storage for temporarily storing instructions, data, or computer addresses. The processor 401 executes instructions (or software modules) stored in a computer-readable storage medium, such as the memory 403 or the storage 408. The computer-readable storage medium may store software modules implementing particular embodiments, and the processor 401 may execute the stored software modules.

The memory 403 may include a random access memory (RAM) 404, a read-only memory (ROM) 405, or a combination thereof. Further, a basic input/output system (BIOS) (e.g., firmware) having basic routines necessary for booting the computing device 400 may be included in the memory 403.

The storage 408 is used to store an operating system 409, executable files (EXEC) 410, data 411, API 412, and the like. The storage 408 may be a hard disk drive, an optical disk drive, a solid-state drive (SSD), and the like.

The computing device 400 may include the input device 433. The user may enter commands and/or information into the computing device 400 via the input device 433. Examples of the input device 433 may include a keyboard, a mouse, a touch pad, a joystick, a game controller, a microphone, an optical scanner, and a camera. The input device 433 may be connected to the bus 440 via an input interface 423 including a serial port, a parallel port, a game port, a Universal Serial Bus (USB), and the like.

In some embodiments, the computing device 400 is connected to the network 430. The computing device 400 is connected to other devices via the network 430. In this case, the network interface 420 receives communication data in the form of one or more packets from the network 430, and the computing device 400 stores the received communication data for the processing of the processor 401. Similarly, the computing device 400 stores the transmitted communication data in the form of one or more packets in the memory 403, and the network interface 420 transmits the communication data to the network 430.

The network interface 420 may include a network interface card, a modem, and the like. Examples of the network 430 may include the Internet, a wide area network (WAN), a local area network (LAN), a telephone network, a direct connection communication, and the like, and a wired and/or wireless communication scheme may be employed.

The execution result of the software module by the processor 401 may be displayed through the display 432. Examples of the display 432 may include a liquid crystal display (LCD), an organic light-emitting (OLED) display, a cathode ray tube (CRT), and a plasma display panel (PDP). The display 432 is connected to the bus 440 via a video interface 422 and the data transfer between the display 432 and the bus 440 can be controlled by a graphics controller 421.

In addition to the display 432, the computing device 400 may include at least one output device 434, such as an audio speaker and a printer. The output device 434 is coupled to the bus 440 via an output interface 424. The output interface 424 may be, for example, a serial port, a parallel port, a game port, a USB, or the like.

At least one of the components, elements, modules or units represented by a block as illustrated in FIGS. 6-13 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a CPU that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include ROM, RAM, compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

Those skilled in the art will appreciate that many variations and modifications can be made to the exemplary embodiments without substantially departing from the principles of the present disclosure. Therefore, the disclosed exemplary embodiments are used in a descriptive sense only and not for purposes of limitation.

What is claimed is:

1. A media streaming apparatus for playing media on a web browser, comprising at least one processor to implement:

a receiving unit configured to receive media data by using a communication protocol which supports web services, the media data being generated by a media service apparatus;
a first media restoring unit configured to decode the media data by a first decoder written in a script which can be parsed by the web browser;
a second media restoring unit configured to decode the media data by a second decoder embedded in the web browser; and
an output unit configured to output the media data decoded by at least one of the first media restoring unit and the second media restoring unit,
wherein the media data is decoded by the at least one of the first media restoring unit and the second media restoring unit based on a streaming mode,
wherein the media data is decoded by the first media restoring unit when the streaming mode is a live streaming mode, and the media data is decoded by the at least one of the first media restoring unit and the second media restoring unit when the streaming mode is a recorded streaming mode.

2. The media streaming apparatus of claim 1, further comprising:
a user interface configured to receive, from a user, an indication of the streaming mode for the media data, the streaming mode being one of the live streaming mode and the recorded streaming mode.

3. The media streaming apparatus of claim 2, wherein when the streaming mode is the recorded streaming mode, the media data is decoded by any one selected from the first media restoring unit and the second media restoring unit according to a type of codec applied to the media data.

4. The media streaming apparatus of claim 1, wherein the communication protocol is a real-time streaming protocol/real-time transport protocol (RTSP/RTP) transmitted over a WebSocket.

5. The media streaming apparatus of claim 1, wherein the first decoder is written in JavaScript.

6. The media streaming apparatus of claim 5, wherein the first decoder is configured to convert native code written in at least one of C and C++ into JavaScript using a code converter.

7. The media streaming apparatus of claim 1, wherein the second decoder is a video tag supported by hypertext markup language version 5 (HTML5).

8. The media streaming apparatus of claim 1, wherein the output unit is further configured to output the media data on the web browser through at least one of a web audio application programming interface (API) and a canvas tag of HTML5.

9. The media streaming apparatus of claim 1, wherein the first media restoring unit is further configured to decode the media data on a frame-by-frame basis.

10. The media streaming apparatus of claim 1, wherein the second media restoring unit is further configured to decode the media data transmitted in containers, each container of the containers comprising a plurality of frames.

11. The media streaming apparatus of claim 10, wherein the media data is packaged in the containers by the second media restoring unit before the decoding by the second media restoring unit.

12. The media streaming apparatus of claim 11, wherein the second media restoring unit comprises:
a depacketizing module configured to depacketize the media data that was received by the receiving unit, and
a container creating module configured to package video frames, obtained by depacketizing the media data, in the containers.

13. A media streaming apparatus for playing media on a web browser, comprising at least one processor to implement:
a receiving unit configured to receive media data by using a communication protocol which supports web services, the media data being generated by a media service apparatus;
a first media restoring unit configured to decode the media data by a first decoder written in a script which can be parsed by the web browser;
a second media restoring unit configured to decode the media data by a second decoder embedded in the web browser; and
an output unit configured to output the media data decoded by at least one of the first media restoring unit and the second media restoring unit,
wherein the media data is decoded by the at least one of the first media restoring unit and the second media restoring unit based on a streaming mode,
a user interface configured to receive, from a user, an indication of the streaming mode for the media data,
wherein the media data is decoded by the first media restoring unit when the streaming mode is a live streaming mode, and the media data is decoded by the at least one of the first media restoring unit and the second media restoring unit when the streaming mode is a recorded streaming mode,
wherein when the streaming mode is the recorded streaming mode,
the media data is decoded by the second media restoring unit in response to a profile element including at least one of a resolution and a frame rate being greater than a predetermined threshold value, and the media data is decoded by the first media restoring unit in response to the profile element being less than the predetermined threshold value.

14. A media streaming apparatus for playing media on a web browser, comprising at least one processor to implement:
a receiving unit configured to receive media data by using a communication protocol which supports web services, the media data being generated by a media service apparatus;
a first media restoring unit configured to decode the media data by a first decoder written in a script which can be parsed by the web browser, wherein the first decoder decodes the media data received by the receiving unit on a frame-by-frame basis;
a second media restoring unit configured to decode the media data by a second decoder embedded in the web browser, wherein the second media storage unit comprises:
a depacketizing module configured to depacketize the media data received by the receiving unit;
a container creating module configured to package video frames, obtained by depacketizing the media data, in containers before the decoding by the second media restoring unit, wherein each container of the containers comprises a plurality of frames; and
the second decoder embedded in the web browser, the second decoder being configured to decode the media data transmitted in the containers;

an output unit configured to output the media data decoded by at least one of the first media restoring unit and the second media restoring unit, wherein the media data is decoded by the first media storage unit when the streaming mode is a live streaming mode such that live streaming media data is decoded on a frame-by-frame basis, and the media data is decoded by one of the first media restoring unit and the second media restoring unit when the streaming mode is a recorded streaming mode.

15. The media streaming apparatus of claim 14, wherein the communication protocol is a real-time streaming protocol/real-time transport protocol (RTSP/RTP) transmitted over a WebSocket.

* * * * *